United States Patent
Moulton et al.

(10) Patent No.: US 10,322,807 B2
(45) Date of Patent: Jun. 18, 2019

(54) SEQUENTIALLY EXTENDING AND ROTATING TABLE MECHANISM

(71) Applicant: B/E Aerospace, Inc., Winston-Salem, NC (US)

(72) Inventors: Kristopher Charles Moulton, Tucson, AZ (US); Ian Lawrence Frost, Tucson, AZ (US)

(73) Assignee: B/E Aerospace, Inc., Winston-Salem, NC (US)

(*) Notice: Subject to any disclaimer, the term of this patent is extended or adjusted under 35 U.S.C. 154(b) by 0 days.

(21) Appl. No.: 15/942,890

(22) Filed: Apr. 2, 2018

(65) Prior Publication Data

US 2018/0305023 A1 Oct. 25, 2018

Related U.S. Application Data

(60) Provisional application No. 62/480,854, filed on Apr. 3, 2017.

(51) Int. Cl.
*B64D 11/06* (2006.01)
*A47B 1/10* (2006.01)

(52) U.S. Cl.
CPC ...... *B64D 11/0605* (2014.12); *B64D 11/0638* (2014.12); *A47B 1/10* (2013.01)

(58) Field of Classification Search
CPC .... B64D 11/0605; B64D 11/0638; A47B 1/10
USPC ........... 108/44; 297/135, 147, 160, 161, 162
See application file for complete search history.

(56) References Cited

U.S. PATENT DOCUMENTS

| | | | | |
|---|---|---|---|---|
| 854,298 A | * | 5/1907 | Matthews | A47C 7/68 297/161 |
| 3,353,866 A | * | 11/1967 | Chapman | A47C 7/70 297/160 |
| 3,467,432 A | * | 9/1969 | Sullivan | A47C 7/70 16/364 |
| 3,751,108 A | * | 8/1973 | Bakanowsky | A47C 7/68 297/160 |
| 4,372,604 A | * | 2/1983 | Raksanyi | B61D 33/005 297/145 |
| 4,852,940 A | * | 8/1989 | Kanigowski | A47B 5/00 297/145 |
| 5,547,247 A | * | 8/1996 | Dixon | A47C 7/70 297/145 |
| 5,606,917 A | * | 3/1997 | Cauffiel | A47B 23/02 108/42 |
| 5,839,780 A | * | 11/1998 | Cauffiel | A47B 21/0314 297/135 |
| 8,109,566 B2 | * | 2/2012 | Koh | A47C 7/70 297/145 |
| 8,336,956 B2 | * | 12/2012 | Westerink | B64D 11/06 108/44 |

(Continued)

*Primary Examiner* — Jose V Chen
(74) *Attorney, Agent, or Firm* — Clements Bernard Walker PLLC

(57) ABSTRACT

A passenger seat tray table mechanism that deploys by way of a controlled sequence of translational and rotational movements. Dependent on tray table mechanism position, the mechanism provides simultaneous unlocking of one motion and locking out of another motion in a predetermined mechanical sequence to avoid passenger entrapment and collisions with surrounding cabinetry of furniture. A wide range of table positions are achievable while all possible paths of table movement can be controlled.

18 Claims, 9 Drawing Sheets

(56) References Cited

U.S. PATENT DOCUMENTS

| | | | | |
|---|---|---|---|---|
| 8,528,968 B2* | 9/2013 | Moulton | ............ | B64D 11/0605 |
| | | | | 297/147 |
| 8,596,206 B2* | 12/2013 | Legeay | ................. | B60N 3/002 |
| | | | | 108/137 |
| 8,801,638 B2* | 8/2014 | Gierse | ...................... | A61G 5/14 |
| | | | | 297/145 |
| 8,813,657 B2* | 8/2014 | Winter | ................... | B60N 3/002 |
| | | | | 108/44 |
| 2005/0140184 A1* | 6/2005 | Williams | ............... | A47B 83/00 |
| | | | | 297/135 |
| 2009/0026812 A1* | 1/2009 | Figueras Mitjans | ..... | A47C 7/70 |
| | | | | 297/162 |
| 2009/0146005 A1* | 6/2009 | Bettell | ................. | B64D 11/064 |
| | | | | 244/118.6 |
| 2012/0318918 A1* | 12/2012 | Johnson | ................. | B64D 11/06 |
| | | | | 244/118.6 |
| 2013/0076082 A1* | 3/2013 | Herault | .................... | B60N 2/00 |
| | | | | 297/173 |
| 2013/0093221 A1* | 4/2013 | Ligonniere | ............ | B64D 11/06 |
| | | | | 297/173 |
| 2014/0001795 A1* | 1/2014 | Hayles | ................. | A47B 83/008 |
| | | | | 297/135 |
| 2015/0321592 A1* | 11/2015 | De Morais | ............ | B64D 11/06 |
| | | | | 297/147 |
| 2015/0351528 A1* | 12/2015 | Gow | ...................... | B60N 3/002 |
| | | | | 297/135 |
| 2016/0375810 A1* | 12/2016 | Kong | ...................... | B60N 2/793 |
| | | | | 297/145 |
| 2018/0279790 A1* | 10/2018 | Pozzi | ...................... | A47B 46/00 |

* cited by examiner

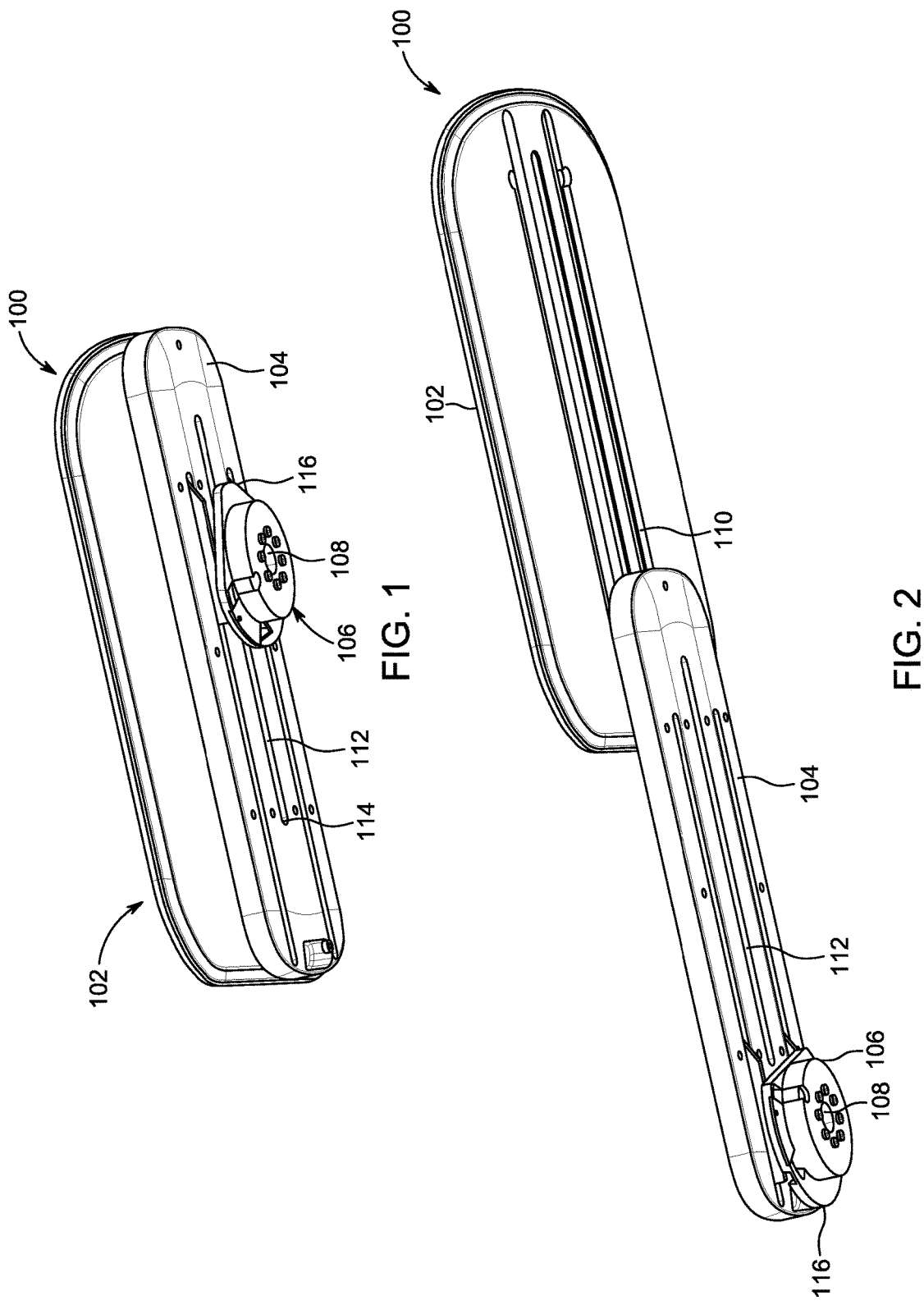

SEQUENTIALLY EXTENDING AND ROTATING TABLE MECHANISM

RELATED APPLICATION AND INCORPORATION BY REFERENCE

This application claims priority from U.S. Provisional Application No. 62/480,854 filed Apr. 3, 2017, the entirety of which is incorporated by reference herein.

BACKGROUND

The inventive concepts disclosed herein relate generally to aircraft passenger seats and tray table configurations, and more particularly, to a table mechanism particularly suited for business class use, wherein the tray table deploys by way of a sequence of rotational and translational movement along a controlled pathway to allow table positioning in a wide range of positions based on passenger preference and needs, and also to permit seat egress while the tray table remains deployed.

Tray tables are a necessity aboard aircraft and other passenger conveyances for dining, working, etc. Tray tables in economy classes typically deploy from against a forward seatback or from within an armrest positioned alongside the seat. Seatback deployable tray tables can be configured to rotate between a vertical orientation when stowed and a horizontal orientation for use. Armrest deployable tray tables can be configured to transition the tray table from a stowed position within a housing to a deployed use position forward of the seated passenger. In either configuration, conventional economy class tray tables must be stowed to egress the seat.

Premium classes can include larger living spaces, lie flat passenger seats, furniture, etc., all of which can be arranged in various configurations and angles relative to other components. In a passenger suite, for example, the seat can be configured to achieve a lie flat sleeping position or deep lounge mode. In such a configuration, space forward of the seat is needed to accommodate seat recline motion, thus furniture positioned forward of the seat may be too far apart from the seat to serve as a suitable tray table mounting location. Further, conventional armrests and surrounding cabinetry may be incapable of mounting a tray table of the type expected in a premium seating class.

Thus, although there are existing tray tables for use in economy and premium seating classes, none can universally accommodate the infinite number of angular relationships possible between seating components in a premium seating class, while at the same time meeting the expectations of premium class passengers.

SUMMARY

In one aspect, embodiments of the inventive concepts disclosed herein are directed to a sequentially extending and rotating tray table mechanism for a passenger seat including a table top assembly mounted for linear motion on a table arm assembly, the table arm assembly mounted for linear motion on a pivot assembly, the pivot assembly adapted to mount on a structure in proximity to a passenger seat, the pivot assembly including a pivot providing rotational motion of the table arm assembly about the pivot assembly, a first stop limiting linear motion between the table top assembly and the table arm assembly past a first predetermined position of the tray table mechanism, and a second stop limiting rotational motion of the pivot, in at least one direction, past at least one second predetermined position of the tray table mechanism, wherein the first and second stops are mechanically coupled such that linear motion and rotational motion are provided in a predetermined sequence dependent on tray table mechanism position.

In another aspect, first linear slides may couple the table top assembly to the table arm assembly, and second linear slides may couple the table arm assembly to the pivot assembly.

In a further aspect, the second stop may be operable when the tray table mechanism is in a stowed position and the first stop may be operable when the tray table mechanism is in a partially deployed position.

In a further aspect, transitioning the tray table mechanism from a stowed position apart from a passenger seat to a deployed position forward of a passenger seat may require, in sequence, translating the table top assembly and table arm assembly from a first position to a second position, rotating the table top assembly and the table arm assembly to a third position, and translating the table top assembly to a fourth position.

In a further aspect, the table top assembly and the table arm assembly when in the fourth position may be permitted to rotate away from a passenger seat to facilitate seat egress and may be prevented from rotating toward the passenger seat.

In a further aspect, the table top assembly and the table arm assembly when in the third position may be permitted to rotate away from a passenger seat to facilitate seat egress and may be prevented from rotating toward the passenger seat.

In a further aspect, the first stop may be operable in the first and second positions of the tray table mechanism, and the second stop may be operable in the first and third positions of the tray table mechanism.

In a further aspect, the first position may correspond to a fully deployed position of the tray table mechanism, the second position may correspond to a partially deployed position of the tray table mechanism, the third position may correspond to a partially deployed position of the tray table mechanism, and the fourth position may correspond to a fully deployed position of the tray table mechanism.

In another aspect, the inventive concepts disclosed herein are directed to an aircraft passenger suite including a passenger seat and a tray table mechanism deployable from a fully stowed position laterally adjacent the seat to a fully deployed position directly forward of the passenger seat, the tray table mechanism including a table top assembly mounted for linear motion on a table arm assembly, the table arm assembly mounted for linear motion on a pivot assembly, the pivot assembly mounted on a stationary structure in proximity to the passenger seat, the pivot assembly including a pivot providing rotational motion of the table arm assembly about the pivot assembly, a first stop limiting linear motion between the table top assembly and the table arm assembly past a first predetermined position of the tray table mechanism, and a second stop limiting rotational motion of the pivot, in at least one direction, past at least one second predetermined position of the tray table mechanism, wherein the first and second stops are mechanically coupled such that linear motion and rotational motion are provided in a predetermined sequence dependent on tray table mechanism position.

Embodiments of the inventive concepts can include one or more or any combination of the above aspects, features, and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 1 is a bottom perspective view of a first embodiment of a table assembly according to the present disclosure;

FIG. 2 is a bottom perspective view showing the table assembly fully extended;

DETAILED DESCRIPTION OF EXEMPLARY EMBODIMENTS

Figure 4:
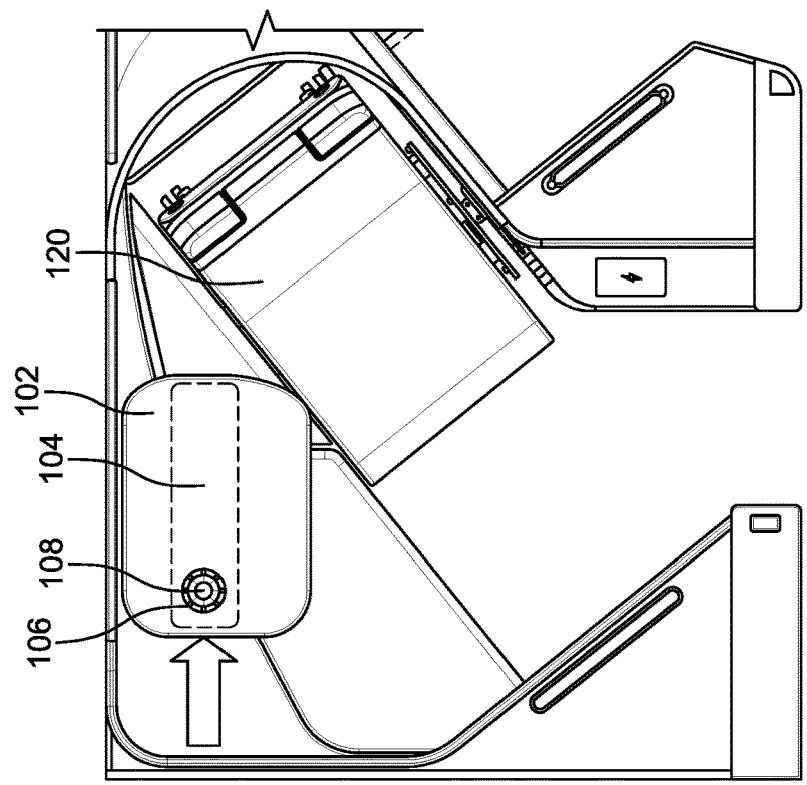
FIG. 4 is a plan view of the suite showing the table assembly in a second position corresponding to a partially deployed position of the table assembly.

The inventive concepts are described hereinafter with reference to the accompanying drawings in which exemplary embodiments are shown. However, the inventive concepts may be embodied in many different forms and should not be construed as limited to the representative embodiments set forth herein.

The inventive concepts disclosed herein are directed to a passenger seat tray table mechanism and passenger suite including the same, wherein the tray table mechanism deploys by way of a controlled sequence of translational and rotational movements. Dependent on tray table mechanism position, the mechanism provides simultaneous unlocking of one motion and locking out of another motion through mechanical coupling in a predetermined mechanical sequence to avoid passenger entrapment and collisions with surrounding cabinetry of furniture. A wide range of table positions are achievable while all possible paths of table movement can be controlled.

Referring to FIGS. 1 and 2, a first embodiment of a tray table mechanism for achieving the above-described sequential deployment control is shown generally at reference numeral 100. The tray table mechanism 100 generally includes a table top assembly 102 mounted for linear motion on an underlying table arm assembly 104. The table arm assembly is mounted for linear motion on a pivot assembly 106 including a rotational pivot 108. The pivot assembly 106 is adapted to mount to a stationary structure in proximity to a passenger seat served by the tray table mechanism 100. In this arrangement, the pivot assembly 106 itself is stationary relative to the passenger seat, while the pivot 108 allows rotational motion of the table arm assembly 104, and the table top assembly carried along therewith, around the rotational pivot 108.

First linear slides 110 couple the table top assembly 102 to the table arm assembly 104, thereby permitting linear translational motion therebetween. One component of the first linear slide 110 is affixed to a bottom of the table top assembly 102. The other component of the first linear slide 110 is affixed to a top of the table arm assembly 104. The first and second components slidably engage to permit and facilitate linear motion between the table top assembly 102 and the table arm assembly 104. In an alternative embodiment, the first linear slides 110 may be defined or embedded within the respective surfaces of the table top assembly 102 and the table arm assembly 104. As shown, the first linear slides 110 are oriented parallel to the longitudinal axis of each of the table top assembly 102 and the table arm assembly 104, and extend substantially the entire length thereof. Orientations other than parallel are possible and envisioned.

Second linear slides 112 couple the table arm assembly 104 to the pivot assembly 106, thereby permitting linear translational motion therebetween. One component of the second linear slide 112 is affixed to a bottom of the table arm assembly 106. The other component of the second linear slide 112 is affixed to a top of the pivot assembly 106. The first and second components slidably engage to permit and facilitate linear motion between the table arm assembly 104 and the pivot assembly 106. In an alternative embodiment, the second linear slides 112 may be defined or embedded within the respective surfaces of the table arm assembly 104 and the pivot assembly 106. As shown, the second linear slide 112 is oriented parallel to the longitudinal axis of the table arm assembly 104, and extends substantially the entire length thereof. Orientations other than parallel are possible and envisioned. Each of the first and second linear slides 110, 112 may be conventional ball bearing slides, roller slides, plain bearing slides, direct engagement of embedded rails, or the like generally providing low-friction linear movement powered by hand or assisted.

A first stop 114 limits linear motion between the table top assembly 102 and the table arm assembly 104 past a first predetermined position of the tray table mechanism 100. A second stop 116 limits rotational motion of the rotational pivot 108, in at least one direction, past at least one second predetermined position of the tray table mechanism 100. The first and second stops are mechanically coupled such that linear motion and rotational motion are provided in a predetermined sequence dependent on tray table mechanism position. The stops may be disposed on the linear slides and/or pivot assembly, and operate dependent on the position of the table arm assembly 104 relative to the pivot assembly 106 and/or the position of the table top assembly 102 relative to the table arm assembly 104. In possible configurations of the stops, the tray table mechanism 100 deploys by a combination of translational movements (e.g., telescopic movement) and rotational movements, wherein the mechanism controls the sequence of movements. Dependent tray table mechanism position, the mechanism provides simultaneous unlocking of one motion (linear or rotational) and locking out of another motion (linear or rotational) in a predetermined mechanical sequence. By linking the translational and rotational motions mechanically, all possible paths of the table movement can be controlled.

FIGS. 3-10 illustrate an exemplary sequence for deploying the tray table mechanism 100 in a premium or business class passenger suite 118. The passenger suite 118 generally includes a passenger seat 120 oriented at an angle to the longitudinal suite axis, which may be parallel or at an angle to the longitudinal aircraft axis. A stationary structure 122, for example a credenza, desk, table, console, etc., is positioned laterally adjacent the right-side of the passenger seat 120 and runs the length of the seat to a position forward of the passenger seat 120. The stationary structure 122 as shown serves as a mounting location for the tray table mechanism, which may alternatively mount to other fixed or movable structures within the suite positioned in proximity to the passenger seat 120. The tray table mechanism 100 transitions between a stowed position alongside and slightly forward of the passenger seat, and a deployed use position forward of the passenger seat 120.

Figure 3:
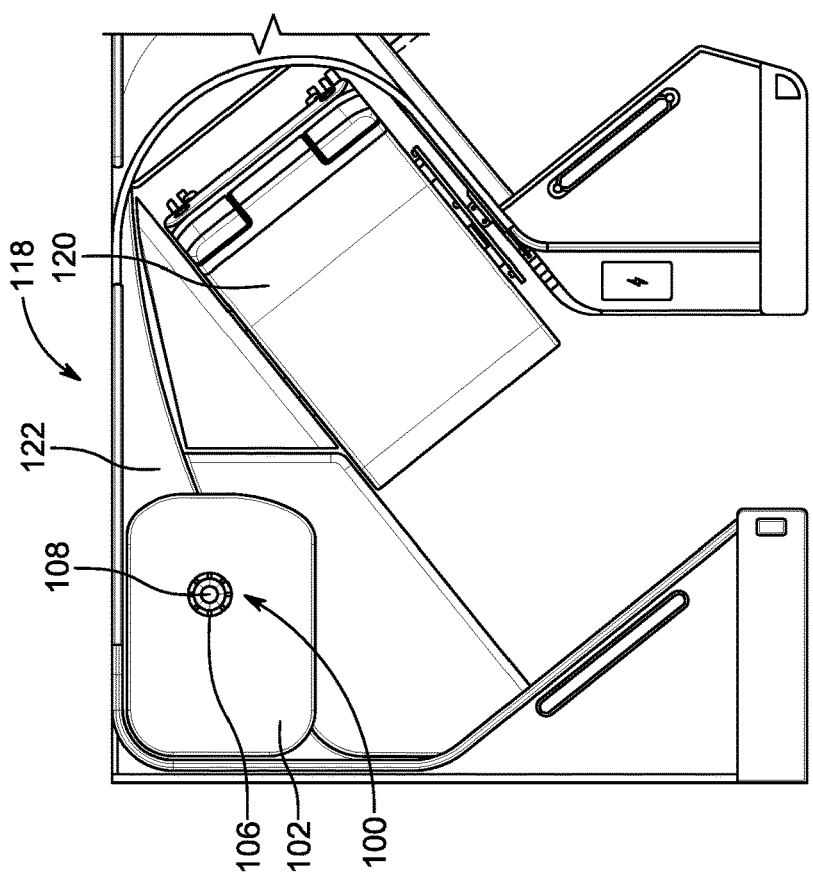
FIG. 3 is a plan view of a first embodiment of an aircraft passenger suite showing the table assembly in a first position corresponding to a stowed position of the table assembly.

FIG. 3 shows the tray table mechanism 100 fully stowed and latched on top of the stationary structure 122 (e.g., credenza). The fully stowed position corresponds to a first position of the tray table mechanism 100. The stationary location of the pivot assembly 106 is shown visible through the table top assembly 102 for reference. Rotational motion around the rotational pivot 108 is prevented in the first position.

FIG. 4 shows the tray table mechanism 100 in a second position corresponding to a partially deployed position. When the latch is released, the tray table mechanism 100 can translate horizontally toward the passenger seat 120 until the pivot assembly 108 contacts a stop of the table arm assembly 104, thereby preventing any further translation. The stop can be positioned at one end of the rail on the underside of the table arm assembly 104. During this initial extension, the table arm assembly 104 and the table top assembly 102 are locked together and move as one on the pivot assembly 106. In this position, the table arm assembly 104 and table top assembly 102 can slide together as one back to the first position, or rotate to a third position.

Figure 5:
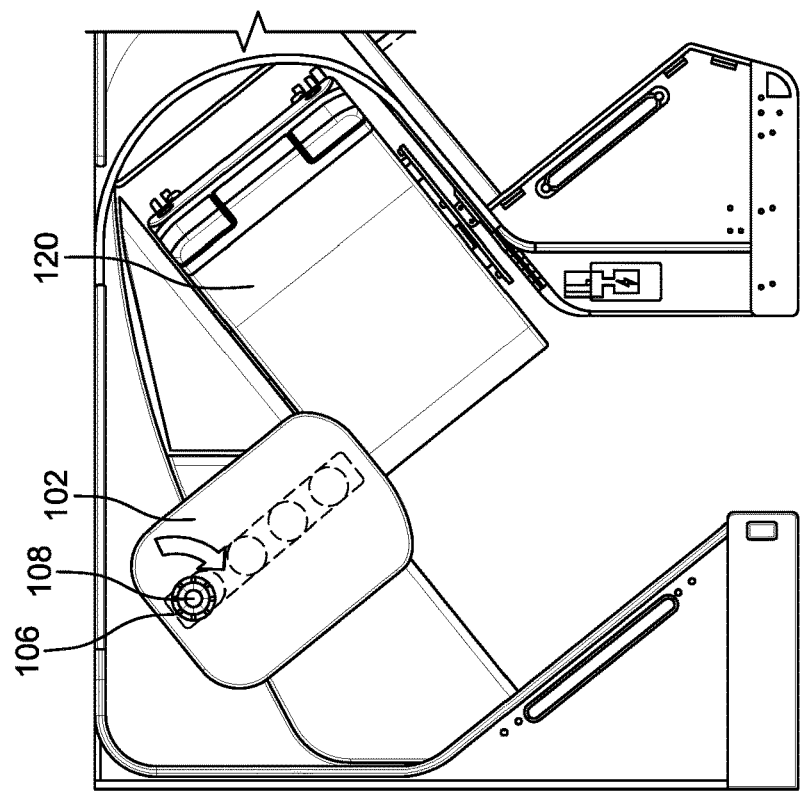
FIG. 5 is a plan view of the suite showing the table assembly in a third position corresponding to a partially deployed and rotated position of the table assembly.

FIG. 5 shows the tray table mechanism 100 in a third position corresponding to a partially deployed position wherein the table top longitudinal axis is perpendicular to the longitudinal passenger seat axis, and thus a possible use position. To move from the second position to the third position, the table top assembly 102 and table arm assembly 104 rotate as one around the rotational pivot 108 until contact is made with the second stop. From the third position, the table top assembly 102 and table arm assembly 104 can be rotated as one back to the second position or extended over the passenger seat 120 to a fourth position.

Figure 6:
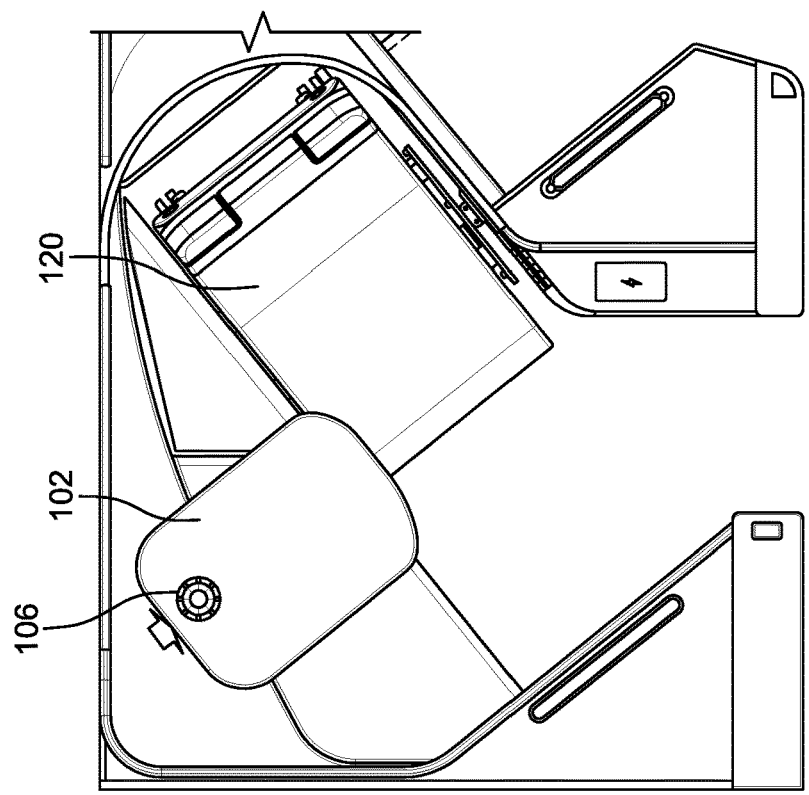
FIG. 6 is a plan view of the suite showing the table assembly generally in the third position.

FIG. 6 shows that rotating the table top assembly 102 and table arm assembly 104 as one allows a small amount of additional extension between the table arm assembly 104 and the pivot assembly 106. Extending the table this small amount unlocks linear motion between the table top assembly 102 and the table arm assembly 104. The lock is mechanically coupled to another lock that is simultaneously engaged between the table arm assembly 104 and the pivot assembly 106.

Figure 8:
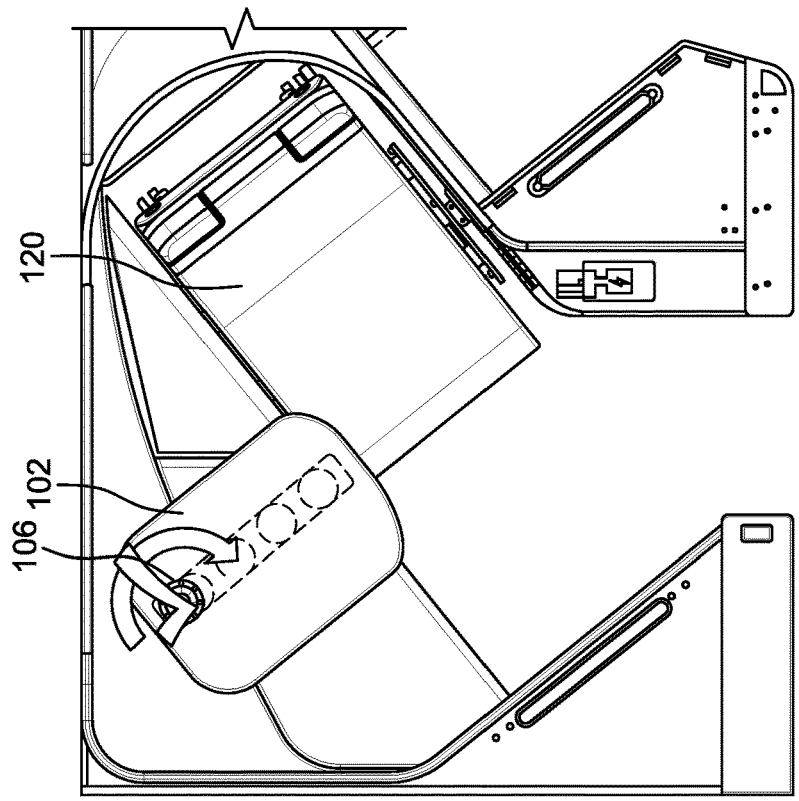
FIG. 8 is a plan view of the suite showing the table assembly generally in the third position wherein rotation in a direction away from the passenger seat is permitted.
Figure 7:
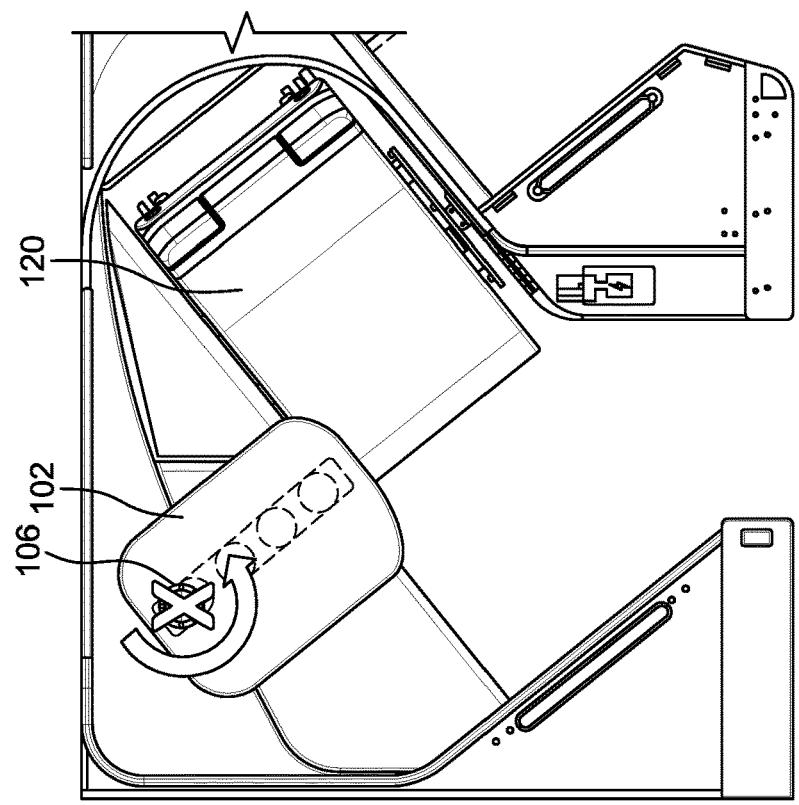
FIG. 7 is a plan view of the suite showing the table assembly generally in the third position wherein rotation in a direction toward the passenger seat is prevented.

FIGS. 7 and 8 shows a possible configuration wherein a small predetermined amount of table extension toward the passenger seat 120 prevents the table from being rotated toward the passenger seat, as shown in FIG. 7, while simultaneously allowing additional rotation away from the passenger seat 120, as shown in FIG. 8. This allows table positioning in a wide array of positions while preventing passenger entrapment.

Figure 9:
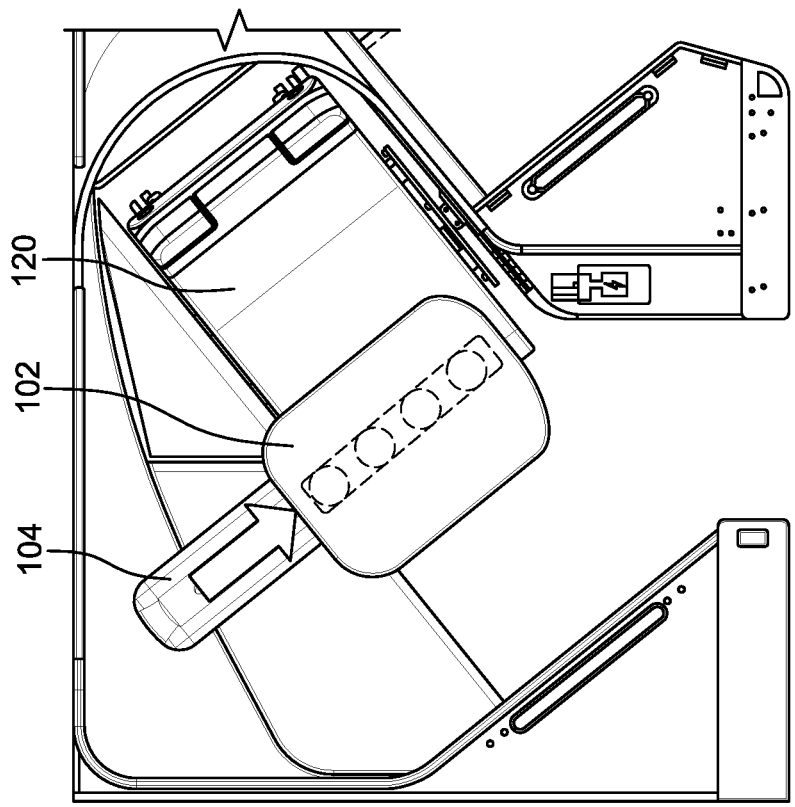
FIG. 9 is a plan view of the suite showing the table assembly in a fourth position corresponding to a fully deployed position of the table assembly.

FIG. 9 shows a fourth position of the tray table mechanism 100 corresponding to a fully deployed position. From the third position, the table top assembly 102 horizontally translates relative to the table arm assembly 104 in a direction toward the passenger seat 120. From the fourth position, the table top assembly 102 can be pushed back to the third position or rotated forward away from the passenger seat to a seat egress position.

Figure 10:
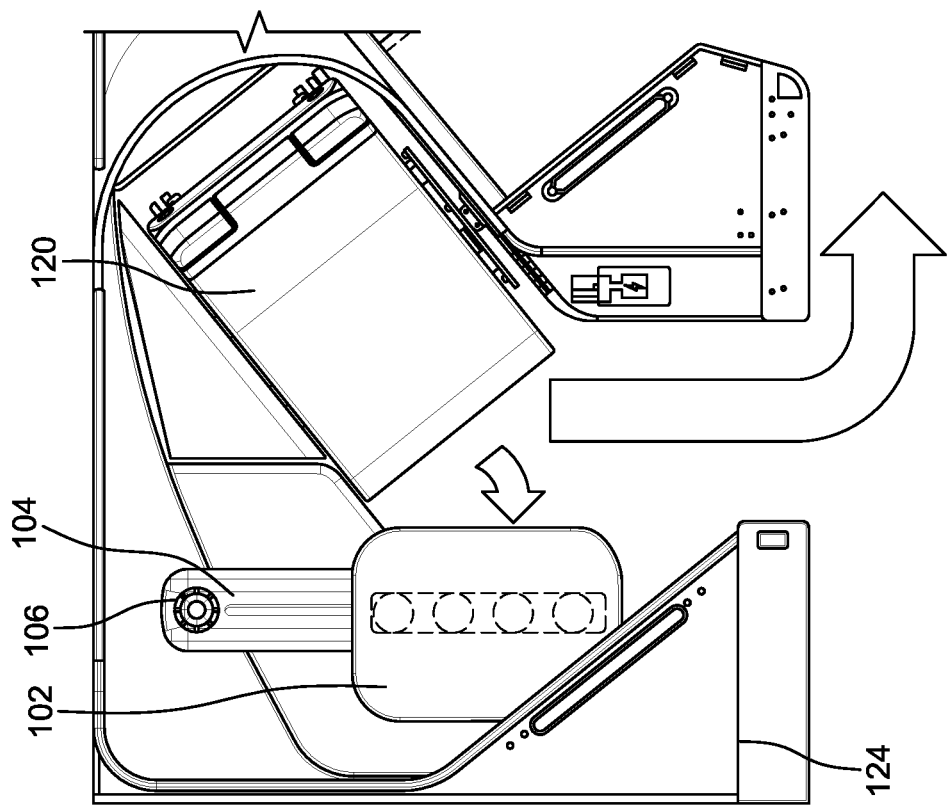
FIG. 10 is a plan view of the suite showing the table assembly in a fifth position corresponding to a fully deployed seat egress position of the table assembly.

FIG. 10 shows a passenger seat egress position of the tray table mechanism 100. In the egress position, the tray table mechanism 100 is fully extended and fully rotated away from the passenger seat 120, which in the particular suite configuration shown, allows the table top assembly 102 to slide partially under the monitor area 124. The egress position allows the passenger to exit the suite without having to stow the tray table mechanism 100. The table top assembly 102 can also be retracted to any desired extension position relative to the table arm assembly 104 throughout this rotation motion.

To stow the table, the mechanism is first rotated back toward the passenger seat until the stop prevents any further rotation. Next the table top assembly is pushed back to the third position. Once in the third position further rotation toward the passenger seat is again permitted. To continue to stow the table, the table is rotated back to the second position. Finally, the table is slid back and latched in the first position.

Figure 11:
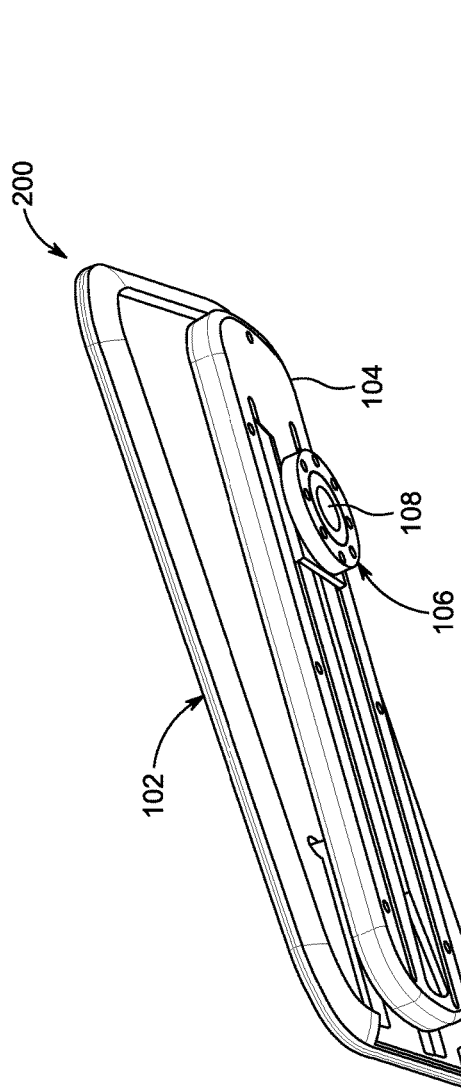
FIG. 11 is a bottom perspective view of a second embodiment of a table assembly according to the present disclosure.
Figure 12:
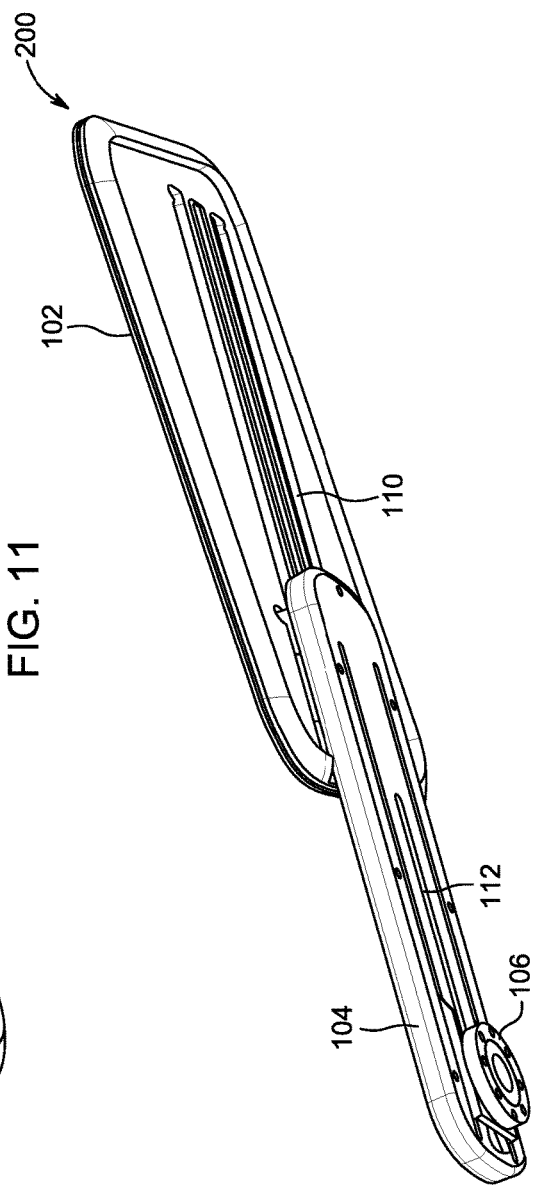
FIG. 12 is a bottom perspective view showing the table assembly fully extended.

Referring to FIGS. 11 and 12, a second embodiment of a tray table mechanism for achieving sequential deployment control is shown generally at reference numeral 200. Like the first embodiment, the tray table mechanism 200 generally includes a table top assembly 102 mounted for linear motion on an underlying table arm assembly 104. The table arm assembly is mounted for linear motion on a pivot assembly 106 including a rotational pivot 108. The pivot assembly 106 is adapted to mount to a stationary structure in proximity to a passenger seat served by the tray table mechanism 100. In this arrangement, the pivot assembly 106 itself is stationary relative to the passenger seat, while the pivot 108 allows rotational motion of the table arm assembly 104, and the table top assembly carried along therewith, around the rotational pivot 108.

First and second stops are mechanically coupled such that linear motion and rotational motion are provided in a predetermined sequence dependent on tray table mechanism position. The stops may be disposed on the linear slides and/or pivot assembly, and operate dependent on the position of the table arm assembly relative to the pivot assembly and/or the position of the table top assembly relative to the table arm assembly. In possible configurations of the stops, the tray table mechanism 200 deploys by a combination of translational movements (e.g., telescopic movement) and rotational movements, wherein the mechanism controls the sequence of movements. Dependent tray table mechanism position, the mechanism provides simultaneous unlocking of one motion (linear or rotational) and locking out of another motion (linear or rotational) in a predetermined mechanical sequence. By linking the translational and rotational motions mechanically, all possible paths of the table movement can be controlled.

FIGS. 13-18 illustrate an exemplary sequence for deploying the tray table mechanism 200 in a business class seating arrangement 202. The seating arrangement 202 generally includes a passenger seat 120 oriented parallel to the longitudinal suite axis, which may be parallel or at an angle to the longitudinal aircraft axis. A stationary structure 122, for example a credenza, desk, table, console, etc., is positioned laterally adjacent the passenger seat 120. The stationary structure 122 as shown serves as a fixed mounting location for the tray table mechanism, which may alternatively mount to other fixed or movable structures within the suite positioned in proximity to the passenger seat 120. The tray table mechanism 200 transitions between a stowed position alongside of the passenger seat 120 and a deployed use position forward of the passenger seat 120.

Figure 13:
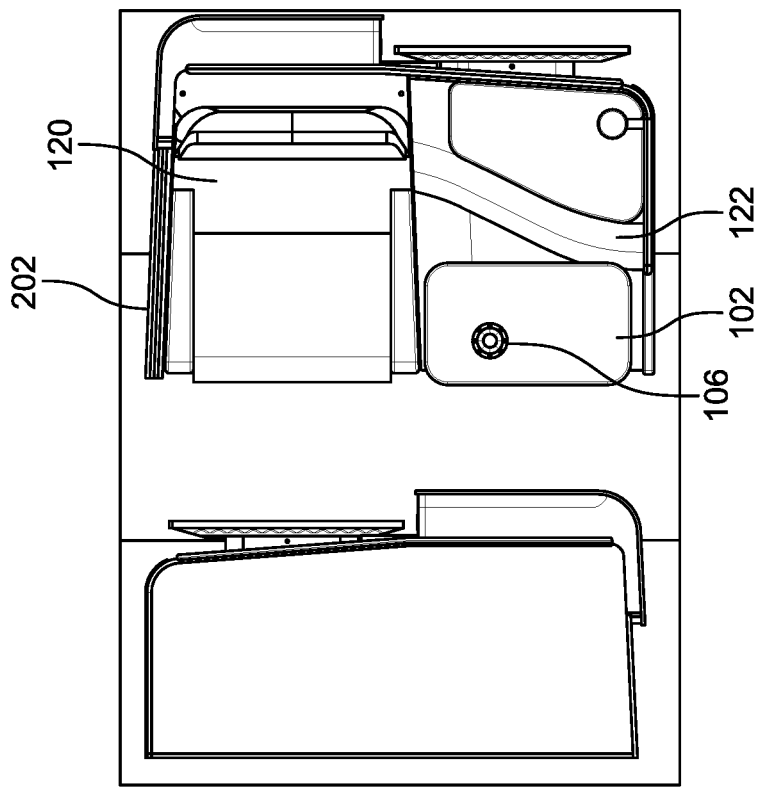
FIG. 13 is a plan view of a second embodiment of an aircraft passenger suite showing the table assembly in a first position corresponding to a stowed position of the table assembly.

FIG. 13 shows the tray table mechanism 200 fully stowed and latched on top of the stationary structure 122. The fully stowed position corresponds to a first position of the tray table mechanism 200. The stationary location of the pivot assembly 106 is shown visible through the table top assembly 102 for reference. Rotational motion around the rotational pivot is prevented in the first position.

Figure 14:
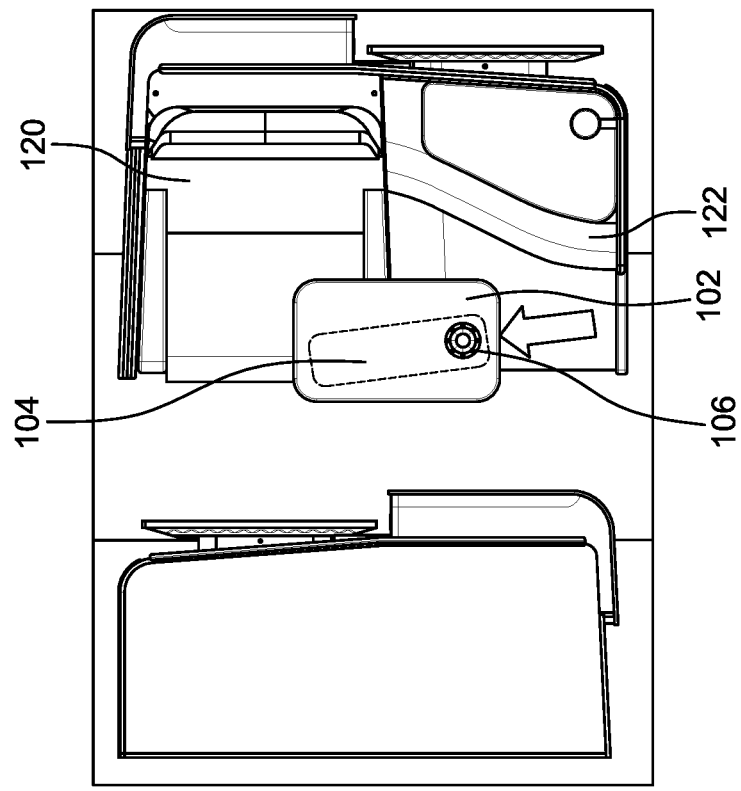
FIG. 14 is a plan view of the suite showing the table assembly in a second position corresponding to a partially deployed position of the table assembly.

FIG. 14 shows the tray table mechanism 200 in a second position corresponding to a partially deployed position. When the latch is released, the tray table mechanism 200 can translate horizontally toward the passenger seat 120 until the pivot assembly 108 contacts a stop of the table arm assembly 104, thereby preventing any further translation. The stop can be positioned at one end of the rail on the underside of the table arm assembly 104. During this initial extension, the table arm assembly 104 and the table top assembly 102 are locked together and move as one on the pivot assembly 106. In this position, the table arm assembly 104 and table top assembly 102 can slide together as one back to the first position, or rotate to a third position.

Figure 16:
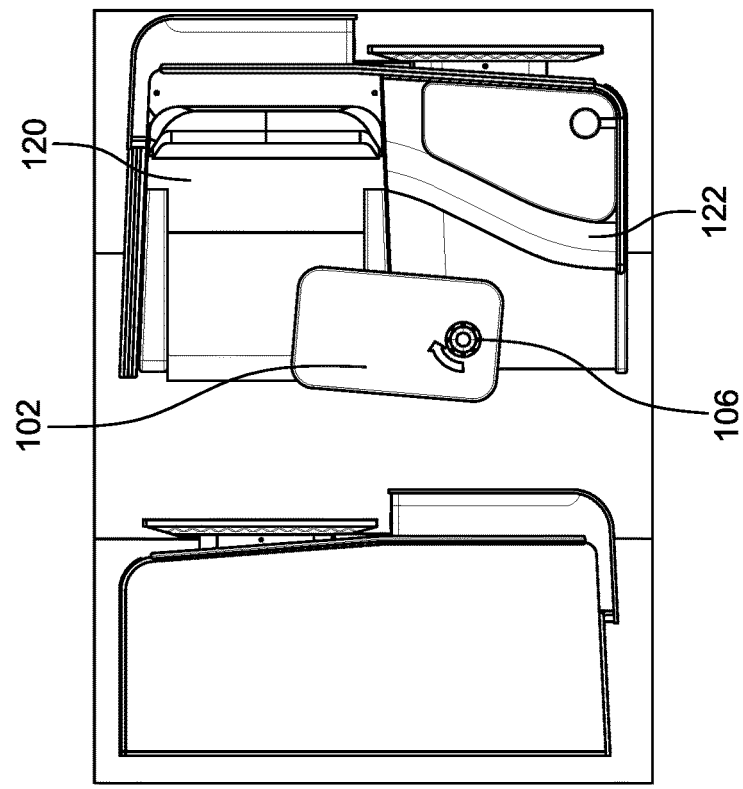
FIG. 16 is a plan view of the suite showing the table assembly in the second position permitting rotation in a direction toward the passenger seat.
Figure 15:
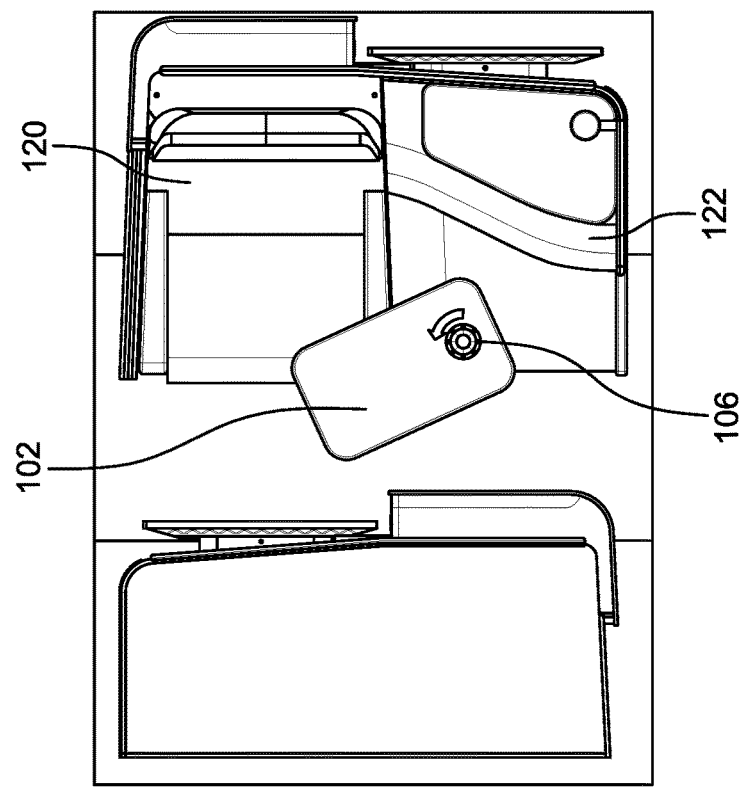
FIG. 15 is a plan view of the suite showing the table assembly in the second position permitting rotation in a direction away from the passenger seat.

At the end of the initial extension, FIGS. 15 and 16 show that the table top assembly 102 and the table arm assembly 104 are able to rotate about the pivot in either direction. Rotation is optional, and the passenger can rotate the table in either direction based on need or preference. At the end of the initial extension, like above, a small amount of additional extension between the table arm assembly 104 and the pivot assembly 106 unlocks linear motion between the table top assembly 102 and the table arm assembly 104. The lock is mechanically coupled to another lock that is simultaneously engaged between the table arm assembly 104 and the pivot assembly 106.

Figure 17:
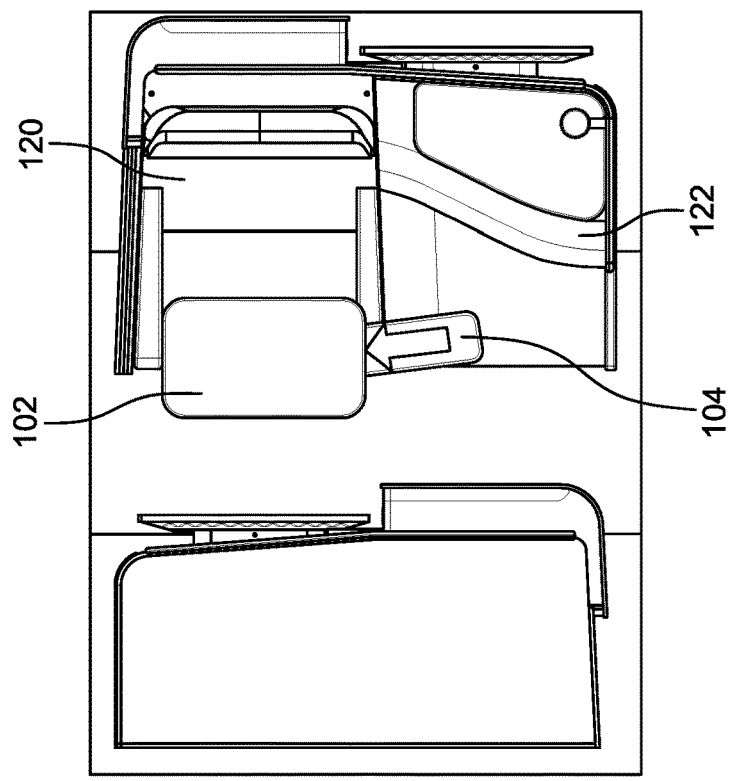
FIG. 17 is a plan view of the suite showing the table assembly in a third position corresponding to a fully deployed position of the table assembly.

FIG. 17 shows a fourth position of the tray table mechanism 200 corresponding to a fully deployed position. From the third position, the table top assembly 102 horizontally translates relative to the table arm assembly 104 in a direction toward the passenger seat 120. From the fourth position, the table top assembly 102 can be pushed back to the third position or rotated forward away from the passenger seat to a seat egress position.

Figure 18:
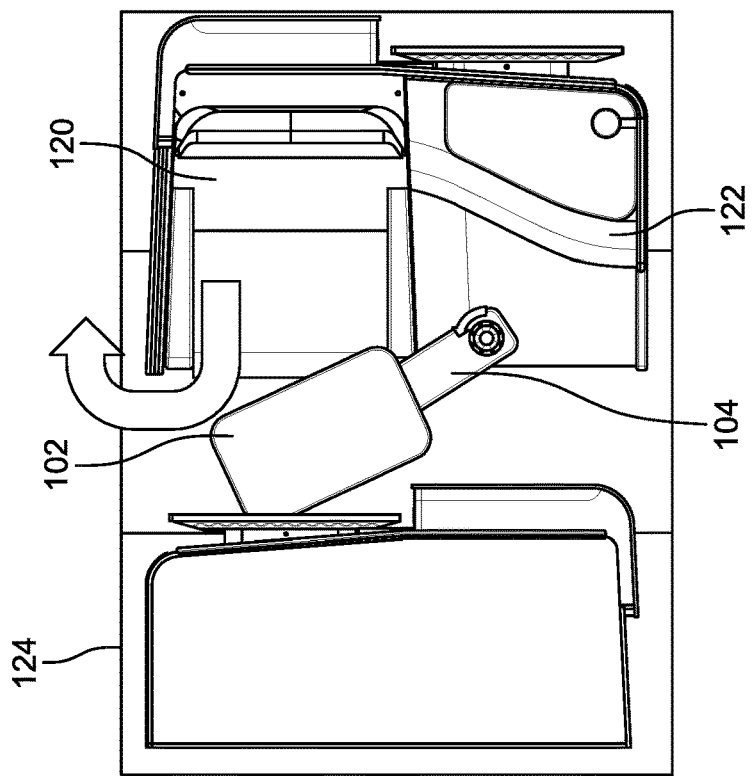
FIG. 18 is a plan view of the suite showing the table assembly in a fourth position corresponding to a fully deployed seat egress position of the table assembly.

FIG. 18 shows a passenger seat egress position of the tray table mechanism 200. In the egress position, the tray table mechanism 200 is fully extended and fully rotated away from the passenger seat 120, which in the particular suite configuration shown, allows the table top assembly 102 to slide partially under the monitor area 124. The egress position allows the passenger to exit the suite without having to stow the tray table mechanism 200. The table top assembly 102 can also be retracted to any desired extension position relative to the table arm assembly 104 throughout this rotation motion.

To stow the table, the mechanism is first rotated back toward the passenger seat until the stop prevents any further rotation. Next the table top assembly is pushed back to the third position. Once in the third position further rotation toward the passenger seat is again permitted. To continue to stow the table, the table is rotated back to the second position. Finally, the table is slid back and latched in the first position.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A sequentially extending and rotating tray table mechanism for a passenger seat, comprising:
   a table top assembly coupled to a table arm assembly such that the table top assembly is linearly movable relative to the table arm assembly;
   the table arm assembly coupled to a pivot assembly such that the table arm assembly is linearly movable relative to the pivot assembly;
   the pivot assembly adapted to mount on a structure in proximity to a passenger seat, the pivot assembly comprising a pivot providing rotational motion of the table arm assembly about the pivot assembly;
   a first stop preventing, when the table arm assembly is linearly moved relative to the pivot assembly from a first position to a second position, linear motion between the table top assembly and the table arm assembly; and
   a second stop permitting, when the table arm assembly is in the second position, the table arm assembly to pivot in a first direction and preventing the table arm assembly from pivoting in a second direction opposite the first direction.

2. The tray table mechanism of claim 1, wherein first linear slides couple the table top assembly to the table arm assembly, and second linear slides couple the table arm assembly to the pivot assembly.

3. The tray table mechanism of claim 1, wherein the second stop prevents the table arm assembly from pivoting when the tray table mechanism is in a stowed position.

4. The tray table mechanism of claim 1, wherein the first stop is operable when the tray table mechanism is in a partially deployed position.

5. The tray table mechanism of claim 1, wherein transitioning the tray table mechanism from a stowed position apart from a passenger seat to a deployed position forward of a passenger seat requires, in sequence, translating the table top assembly and table arm assembly together from the first position to the second position, rotating the table top assembly and the table arm assembly to a third position, and translating the table top assembly relative to the table arm assembly to a fourth position.

6. The tray table mechanism of claim 5, wherein the table top assembly and the table arm assembly when in the fourth position are permitted to rotate away from a passenger seat to facilitate seat egress and are prevented from rotating toward the passenger seat.

7. The tray table mechanism of claim 5, wherein the table top assembly and the table arm assembly when in the third position are permitted to rotate away from a passenger seat to facilitate seat egress and are prevented from rotating toward the passenger seat.

8. The tray table mechanism of claim 5, wherein the first stop is operable to prevent linear motion between the table top assembly and the table arm assembly in the first and second positions of the tray table mechanism, and the second stop is operable, in the third position, to permit rotation of the table top assembly and the table arm assembly away from a passenger seat to facilitate seat egress, and prevent rotation of the table top assembly and the table arm assembly toward the passenger seat.

9. The tray table mechanism of claim 5, wherein the first position corresponds to a stowed position of the tray table mechanism, the second position corresponds to a partially deployed position of the tray table mechanism, the third position corresponds to another partially deployed position of the tray table mechanism, and the fourth position corresponds to a fully deployed position of the tray table mechanism.

10. An aircraft passenger suite, comprising:
a passenger seat; and
a tray table mechanism deployable from a fully stowed position laterally adjacent the passenger seat to a fully deployed position directly forward of the passenger seat, the tray table mechanism comprising:
  a table top assembly coupled to a table arm assembly such that the table top assembly is linearly movable relative to the table arm assembly;
  the table arm assembly coupled to a pivot assembly such that the table arm assembly is linearly movable relative to the pivot assembly;
  the pivot assembly mounted on a stationary structure in proximity to the passenger seat, the pivot assembly comprising a pivot providing rotational motion of the table arm assembly about the pivot assembly;
  a first stop preventing, when the table arm assembly is linearly moved relative to the pivot assembly from the fully stowed to a second position, linear motion between the table top assembly and the table arm assembly; and
  a second stop permitting, when the table arm assembly is in the second position, the table arm assembly to pivot in a first direction and preventing the table arm assembly from pivoting in a second direction opposite the first direction.

11. The aircraft passenger suite of claim 10, wherein first linear slides couple the table top assembly to the table arm assembly, and second linear slides couple the table arm assembly to the pivot assembly.

12. The aircraft passenger suite of claim 10, wherein the second stop prevents the table arm assembly from pivoting when the tray table mechanism is in the stowed position.

13. The aircraft passenger suite of claim 10, wherein the first stop is operable when the tray table mechanism is in a partially deployed position.

14. The aircraft passenger suite of claim 10, wherein transitioning the tray table mechanism from the fully stowed position to the fully deployed position requires, in sequence, translating the table top assembly and table arm assembly together from the fully stowed position to the second position, rotating the table top assembly and the table arm assembly to a third position, and translating the table top assembly to a fourth position.

15. The aircraft passenger suite of claim 14, wherein the table top assembly and the table arm assembly when in the fourth position are permitted to rotate away from the passenger seat to facilitate seat egress and are prevented from rotating toward the passenger seat.

16. The aircraft passenger suite of claim 15, wherein the table top assembly and the table arm assembly when in the third position are permitted to rotate away from the passenger seat to facilitate seat egress and are prevented from rotating toward the passenger seat.

17. The aircraft passenger suite of claim 15, wherein the first stop is operable in the first and second positions of the tray table mechanism, and the second stop is operable in the first and third positions of the tray table mechanism.

18. The aircraft passenger suite of claim 15, wherein the first position corresponds to the fully stowed position of the tray table mechanism, the second position corresponds to a partially deployed position of the tray table mechanism, the third position corresponds to another partially deployed position of the tray table mechanism, and the fourth position corresponds to the fully deployed position of the tray table mechanism.

* * * * *